(12) United States Patent　　　(10) Patent No.: US 9,414,102 B2
Chang et al.　　　(45) Date of Patent: Aug. 9, 2016

(54) SYSTEM AND METHOD FOR DAYPARTING AUDIO-VISUAL CONTENT

(71) Applicant: PurpleComm, Inc., San Jose, CA (US)

(72) Inventors: Jack H. Chang, Saratoga, CA (US); William Sheu, Fremont, CA (US); Sherman Tuan, Cupertino, CA (US); Daniel Lee, Santa Clara, CA (US)

(73) Assignee: PurpleComm, Inc., San Jose, CA (US)

( * ) Notice: Subject to any disclaimer, the term of this patent is extended or adjusted under 35 U.S.C. 154(b) by 145 days.

(21) Appl. No.: 14/058,168

(22) Filed: Oct. 18, 2013

(65) Prior Publication Data

US 2015/0113552 A1　　Apr. 23, 2015

(51) Int. Cl.
*H04N 21/2665*　　(2011.01)
*H04N 21/258*　　(2011.01)
*H04N 21/237*　　(2011.01)
*H04N 21/25*　　(2011.01)

(52) U.S. Cl.
CPC ......... *H04N 21/2665* (2013.01); *H04N 21/237* (2013.01); *H04N 21/252* (2013.01); *H04N 21/25875* (2013.01); *H04N 21/25883* (2013.01); *H04N 21/25891* (2013.01)

(58) Field of Classification Search
None
See application file for complete search history.

(56) References Cited

U.S. PATENT DOCUMENTS

| | | | |
|---|---|---|---|
| 2012/0124630 A1* | 5/2012 | Wellen et al. | 725/109 |
| 2013/0198788 A1* | 8/2013 | Barger et al. | 725/93 |
| 2014/0259038 A1* | 9/2014 | Belyaev et al. | 725/14 |

* cited by examiner

*Primary Examiner* — Omar S Parra
(74) *Attorney, Agent, or Firm* — Nixon Peabody LLP (57) ABSTRACT

A computer implemented method for organizing and delivering audio-visual online content, having: on a computing device having one or more processors and a memory storing one or more programs for execution by the one or more processors, the one or more programs including instructions for: developing a dayparting ratio of the audio-visual online content based on information extracted from an electronic programming guide, and modifying the dayparting ratio of the audio-visual online content based on information extracted from a publicly available internet-based content provider. The method may also include modifying the dayparting ratio of the audio-visual online content based on information extracted from a password-protected internet-based content provider. The method may also include delivering the audio-visual online content based on the modified dayparting ratio. Also, a computer system including one or more processors and memory to store one or more programs including the instructions. Further, a nontransitory computer readable storage medium storing one or more programs including the instructions.

18 Claims, 10 Drawing Sheets

SYSTEM AND METHOD FOR DAYPARTING AUDIO-VISUAL CONTENT

TECHNICAL FIELD

The present disclosure relates to a computer implemented method, a computer system and computer software for organizing and delivering audio-visual content and the like.

SUMMARY

The present disclosure provides numerous advantages over the prior art. For example, the present method, system and software can help users discover interesting videos from the at times overwhelming daily deluge of online videos. The present disclosure can help users identify the right video to watch. The present disclosure utilizes video discovery techniques.

Dayparting in the traditional broadcast television industry involves partitioning a broadcast day into a plurality of segments, such as six or seven segments. The present disclosure improves the traditional dayparting concept by integrating information from one or more information sources including but not limited to traditional television guides or listings, open websites and content providers, and a particular user's own password-protected websites and content providers. The present disclosure can be adapted to organize and display audio-visual content from content providers such as YouTube and from social media websites such as Facebook. The present disclosure can be adapted to access and utilize publicly available information and/or password-protected information.

Users can watch online videos anywhere and at any time. However, the sheer quantity of online videos makes it difficult for a user to organize a cohesive display of content. Quite simply, there are many videos that a given user would not want to watch at all. In the online environment, many users have difficulty knowing where to start watching. Rarely do users just go to a site such as YouTube and try to figure out "what am I going to watch today?" Even though there is a lot of content available, it can be difficult to differentiate content based on parameters such as age (is the content new or old?), content (is this the category of content that I want to watch?) and time of day (is this time of day that I want to watch a particular category of content?).

The present disclosure creates a novel way to present online videos in a way that, in some respects, mimics traditional broadcast television. In addition to presenting online content in a dayparted format, the present disclosure can also incorporate personalization features unique to a given user that differs considerably from traditional broadcast television models.

The present disclosure utilizes an algorithm or ratio that allows a user to organize videos into different categories. The present disclosure can determine whether a particular piece of content is relatively new or old.

The present disclosure can present a partition of a given pool of videos into different segments. The present disclosure can present a small segment of those videos to the user at a particular time of the day. For example, the present disclosure can determine that between the hours of 5 a.m. and 9 a.m., the system will, based on the user's preferences, only present a carefully curated set of videos that caters towards the topic of interest to that user at that particular time period. As the day goes by, the present disclosure is adapted to change the content of the videos based on the parameters for the next segment in the day.

The algorithms or ratios used in the present disclosure can be flexible. For example, once certain videos are broadcast and presented, the system can be adapted so that the previously presented video is no longer viewable. In this sense, the present disclosure can be adapted to deliver content in a manner that is, in some respects, similar to traditional, linear television broadcasting without the use of recording devices such as a digital video recorder or DVR. The present disclosure can be adapted to deliver a continuous stream of broadcasting.

In one aspect, provided herein is a computer implemented method for organizing and delivering audio-visual online content, comprising: on a computing device having one or more processors and a memory storing one or more programs for execution by the one or more processors, the one or more programs including instructions for: developing a dayparting ratio of the audio-visual online content based on a first source of information, and modifying the dayparting ratio of the audio-visual online content based on a second source of information. The method may also include modifying the dayparting ratio of the audio-visual online content based on a third source of information, and delivering the audio-visual online content based on the modified dayparting ratio.

In one embodiment of this aspect, the first source of information is information extracted from an electronic programming guide, wherein the second source of information is information extracted from a publicly available internet-based content provider and wherein the third source of information is information extracted from a password-protected internet-based content provider.

In another embodiment of this aspect, the step of developing the dayparting ratio of the audio-visual online content based on the information extracted from the electronic programming guide (EPG) of cable or satellite content providers comprises instructions for: collecting television listing data from electronic programming guides; consolidating television listing data with local programming; classifying program listings into model categories; identifying model dayparting slots in which each model category belongs; calculating a model category distribution in each model dayparting slot to form the model dayparting ratio; and inputting the model dayparting ratio into a dayparting distribution system.

In another embodiment of this aspect, the step of modifying the dayparting ratio of the audio-visual online content based on the information extracted from the publicly available internet-based content provider comprises instructions for: collecting video channels from the publicly available internet-based content provider; analyzing the collected video channels; classifying channels from the collected video channels; matching the web channel classifications with model categories; applying the web channel classifications to model dayparting slots to form a modified dayparting ratio; and inputting the modified dayparting ratio into the dayparting distribution system.

In another embodiment of this aspect, the step of modifying the dayparting ratio of the audio-visual online content based on the information extracted from the password-protected internet-based content provider comprises instructions for: prompting a user to sign into the password-protected internet-based content provider; retrieving subscriptions from the password-protected internet-based content provider; classifying the password-protected internet-based content provider subscriptions into categories; matching the password-protected internet-based content provider subscription classifications with model categories; formulating a ratio of password-protected internet-based content provider subscriptions; consolidating the password-protected internet-based content provider subscription ratio with a model dayparting ratio; and inputting the consolidated dayparting ratio into the dayparting distribution system.

In another embodiment of this aspect, the password-protected internet-based content provider is a social media website, and the step of modifying the dayparting ratio of the audio-visual online content based on the information extracted from the social media website comprises instructions for: prompting a user to sign into the social media website; collecting videos shared by the user and friends of the user; identifying video channels based on the shared videos; classifying the video channels into categories; determine time-of-postings and a distribution ratio; altering a model dayparting ratio based on the distribution ratio, and inputting the altered dayparting ratio into the dayparting distribution system.

In another embodiment of this aspect, the step of modifying the dayparting ratio of the audio-visual online content based on the information extracted from the password-protected internet-based content provider comprises instructions for: selecting characteristics of a user from the information extracted from the password-protected internet-based content provider; identifying similar users based on the selected characteristics of the user; altering a model dayparting ratio based on the characteristics of the similar users; and inputting the altered dayparting ratio into the dayparting distribution system.

In another embodiment of this aspect, the step of modifying the dayparting ratio of the audio-visual online content based on the information extracted from the password-protected internet-based content provider comprises instructions for: analyzing a user's behavior history based on the information extracted from the password-protected internet-based content provider; and determining whether system dayparting stacks or a user's own subscriptions are to be utilized.

In another embodiment of this aspect, if the user's recorded behavior is on the system dayparting stacks, the step of modifying the dayparting ratio of the audio-visual online content based on the information extracted from the password-protected internet-based content provider comprises instructions for: determining the most-watched channels on the password-protected internet-based content provider; altering a model dayparting ratio based on the most-watched channels; and inputting the altered dayparting ratio into the dayparting distribution system.

In another embodiment of this aspect, if the user's usage recorded behavior is the user's own subscriptions, the step of modifying the dayparting ratio of the audio-visual online content based on the information extracted from the password-protected internet-based content provider comprises instructions for: determining the most-watched subscriptions on the password-protected internet-based content provider; determining a time when the most-watched subscriptions are watched; altering a model dayparting ratio based on the most-watched subscriptions; and inputting the altered dayparting ratio into the dayparting distribution system.

In another embodiment of this aspect, the step of delivering the audio-visual online content based on the modified dayparting ratio comprises at least one instruction from the group consisting of: returning more subscriptions based on the modified dayparting ratio at different dayparting time slots; adding at least one most-watched channel from a user's subscriptions into an appropriate dayparting time slot; and returning virtual channels based on the modified dayparting ratio.

In another embodiment of this aspect, the modified dayparting ratio comprises dayparts and categories.

In another embodiment of this aspect, the dayparts comprise at least one daypart from the group consisting of: morning shows in a first time slot; daytime mix in a second time slot; slack time in a third time slot; evening news in a fourth time slot; primetime originals in a fifth time slot; late night shows in a sixth time slot; and night owl in a seventh time slot.

In another embodiment of this aspect, the categories comprise at least one category from the group consisting of: news, morning shows, music, sports, funny, movie reviews/trailers, fashion & style, food, travel, light news & entertainment, videogames, how-to, original movies, talent shows, shorts, premium television shows, cartoons, late night talk shows, mature humor, fail and mature audience.

In another aspect, provided herein is a computer system for organizing and delivering audio-visual online content, the computer system comprising one or more processors; and memory to store one or more programs, the one or more programs comprising instructions for: developing a dayparting ratio of the audio-visual online content based on a first source of information. The system may also modify the dayparting ratio of the audio-visual online content based on a second source of information. The system may also modify the dayparting ratio of the audio-visual online content based on a third source of information. The system then delivers the audio-visual online content based on the modified dayparting ratio.

In another aspect, provided herein in a nontransitory computer readable storage medium storing one or more programs configured to be executed by one or more processing units at a computer, the one or more programs comprising instructions for: developing a dayparting ratio of the audio-visual content based on a first source of information. The one or more programs may further include instructions for modifying the dayparting ratio of the audio-visual online content based on a second source of information. The one or more programs may further include instructions for modifying the dayparting ratio of the audio-visual online content based on a third source of information. The one or more programs further include instructions for delivering the audio-visual content based on the modified dayparting ratio.

BRIEF DESCRIPTION OF THE DRAWINGS

The accompanying drawings, which are incorporated into this specification, illustrate one or more exemplary embodiments disclosed herein and, together with the detailed description, serve to explain the principles and exemplary implementations of these embodiments. One of skill in the art will understand that the drawings are illustrative only, and that what is depicted therein may be adapted based on the text of the specification and the spirit and scope of the teachings herein.

According to one embodiment, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

In the drawings, where like reference numerals refer to like reference in the specification.

DETAILED DESCRIPTION

It should be understood that this disclosure is not limited to the particular methodology, protocols, etc., described herein and as such may vary. The terminology used herein is for the purpose of describing particular embodiments only, and is not intended to limit the scope of the present disclosure, which is defined solely by the claims.

As used herein and in the claims, the singular forms include the plural reference and vice versa unless the context clearly indicates otherwise. Other than in the operating examples, or where otherwise indicated, all numbers expressing quantities used herein should be understood as modified in all instances by the term "about."

All publications identified are expressly incorporated herein by reference for the purpose of describing and disclosing, for example, the methodologies described in such publications that might be used in connection with the present disclosure. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

Unless defined otherwise, all technical and scientific terms used herein have the same meaning as those commonly understood to one of ordinary skill in the art to which this disclosure pertains. Any known methods, devices, and materials may be used in the practice or testing of the disclosure, and the methods, devices, and materials disclosed herein are provided for purposes of illustration and to facilitate an understanding of the disclosure.

Some Selected Definitions

Unless stated otherwise, or implicit from context, the following terms and phrases include the meanings provided below. Unless explicitly stated otherwise, or apparent from context, the terms and phrases below do not exclude the meaning that the term or phrase has acquired in the art to which it pertains. The definitions are provided to aid in describing particular embodiments of the aspects described herein, and are not intended to limit the disclosure, because the scope of the invention is limited only by the claims. Further, unless otherwise required by context, singular terms shall include pluralities and plural terms shall include the singular.

As used herein the term "comprising" or "comprises" is used in reference to compositions, methods, and respective component(s) thereof, that are useful to the disclosure, yet open to the inclusion of unspecified elements, whether useful or not.

As used herein the term "consisting essentially of" refers to those elements useful for a given embodiment. The term permits the presence of additional elements that do not materially affect the basic and novel or functional characteristic(s) of that embodiment of the disclosure.

The term "consisting of" refers to compositions, methods, and respective components thereof as described herein, which are exclusive of any element not recited in that description of the embodiment.

Other than in the operating examples, or where otherwise indicated, all numbers expressing quantities used herein should be understood as modified in all instances by the term "about." The term "about" when used in connection with percentages may mean±1%.

The singular terms "a," "an," and "the" include plural referents unless context clearly indicates otherwise. Similarly, the word "or" is intended to include "and" unless the context clearly indicates otherwise. Thus for example, references to "the method" includes one or more methods, and/or steps of the type described herein and/or which will become apparent to those persons skilled in the art upon reading this disclosure and so forth.

Although methods and materials similar or equivalent to those described herein can be used in the practice or testing of this disclosure, suitable methods and materials are described below. The term "comprises" means "includes." The abbreviation, "e.g." is derived from the Latin exempli gratia, and is used herein to indicate a non-limiting example. Thus, the abbreviation "e.g." is synonymous with the term "for example."

According to one embodiment, the components, processes and/or data structures may be implemented using machine language, assembler, C or C++, Java and/or other high level language programs running on a data processing computer such as a personal computer, workstation computer, mainframe computer, or high performance server running an OS. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general-purpose machines; and. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the present disclosure, the term "network" includes local area networks (LANs), wide area networks (WANs), metro area networks, residential networks, corporate networks, inter-networks, the Internet, the World Wide Web, cable television systems, telephone systems, wireless telecommunications systems, fiber optic networks, token ring networks, Ethernet networks, ATM networks, frame relay networks, satellite communications systems, and the like. Such networks are well known in the art and consequently are not further described here.

In the context of the present disclosure, the term "distributed" describes a digital information system dispersed over multiple computers and not centralized at a single location.

In the context of the present disclosure, the term "processor" describes a physical computer (either stand-alone or distributed) or a virtual machine (either stand-alone or distributed) that processes or transforms data. The processor may be implemented in hardware, software, firmware, or a combination thereof.

In the context of the present disclosure, the term "data store" describes a hardware and/or software means or apparatus, either local or distributed, for storing digital or analog information or data. The term "data store" describes, by way of example, any such devices as random access memory (RAM), read-only memory (ROM), dynamic random access memory (DRAM), static dynamic random access memory (SDRAM), Flash memory, hard drives, disk drives, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "data store" also describes, by way of example, databases, file systems, record systems, object oriented databases, relational databases, SQL databases, audit trails and logs, program memory, cache and buffers, and the like.

In the context of the present disclosure, the term "network interface" describes the means by which users access a network for the purposes of communicating across it or retrieving information from it.

In the context of the present disclosure, the term "system" describes any computer information and/or control device, devices or network of devices, of hardware and/or software, comprising processor means, data storage means, program means, and/or user interface means, which is adapted to communicate with the embodiments of the present disclosure, via one or more data networks or connections, and is adapted for use in conjunction with the embodiments of the present disclosure.

To the extent not already indicated, it will be understood by those of ordinary skill in the art that any one of the various embodiments herein described and illustrated may be further modified to incorporate features shown in any of the other embodiments disclosed herein.

The term "Virtual Channel" describes an auto-generated channel aggregating the newest videos from all the channels contained within a pre-defined group of channels (also known as a "set" of channels).

The term "Channel" describes a linear sequence of multiple videos.

The term "Category" describes a class or genre of channels (e.g., News, Sports, Music and the like).

The term "Day-Part" describes a predefined time-frame within a day (see, Table 1).

The term "day-parting stack" or just "stack" refers to a list of programs in which the program most recently stored is the first to be retrieved.

The following examples illustrate some embodiments and aspects of the invention. It will be apparent to those skilled in the relevant art that various modifications, additions, substitutions, and the like can be performed without altering the spirit or scope of the disclosure, and such modifications and variations are encompassed within the scope of the invention as defined in the claims which follow. The following examples do not in any way limit the invention.

Figure 1:
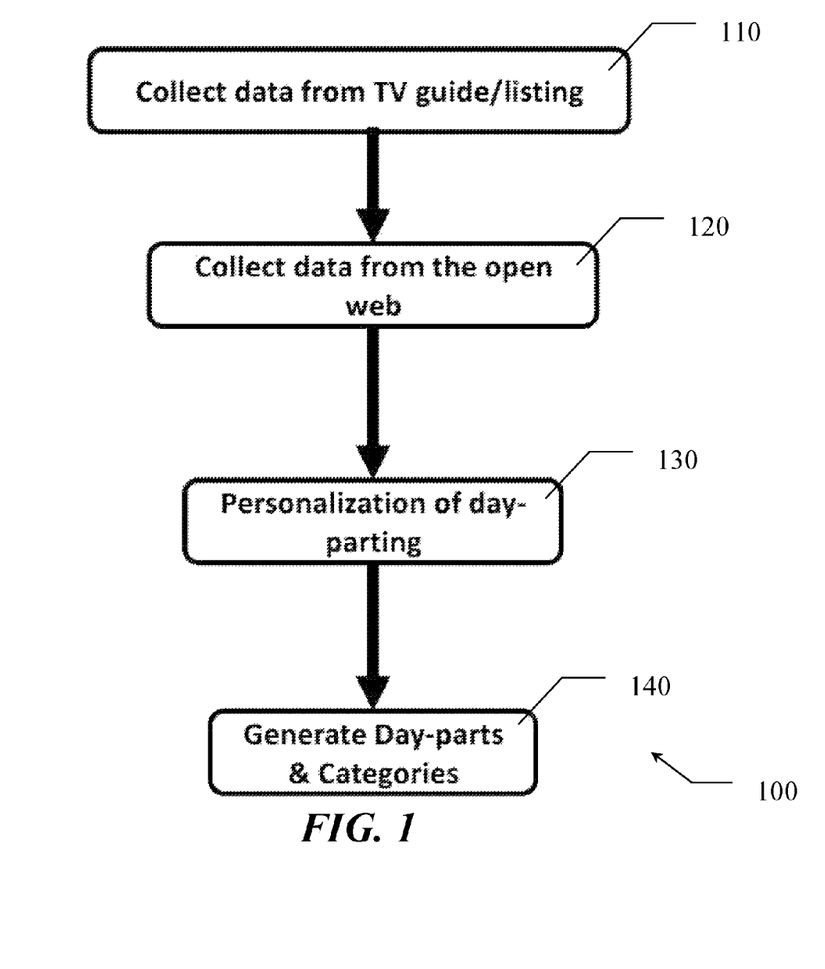
FIG. 1 depicts an overview of a method and system according to the present disclosure.

FIG. 1 depicts an overview of a method and system 100 according to the present disclosure. The method and system 100 can include a step of collecting data from a first data source 110, where the first data source can be a TV guide or TV listing. The method and system 100 can include a step of collecting data from a second data source 120, where the second data source can be the open web. The method and system 100 can include a step of personalizing day-parting 130 utilizing the results of step 110 and/or step 120. The method and system 100 can include a step of generating day-parts and categories utilizing the results of step 130.

The step of collecting data from a first data source 110 can include collecting data from an electronic programming guide. The step 110 can include identification of a universal lifestyle associated with the an electronic programming guide. Step 110 can consolidate data from national or non-local programming with local programming. For example, network programs from a national network (such as NBC) can be consolidated with local programming. Step 110 can include classifying program listings into categories. Step 110 can include identifying a time slot and the ratio of a particular category's programming in the time slot. For example, an analysis of data collected from the step 110 can show that between 6 a.m. and 7 a.m., 90% of the programming is categorized as news and 10% of the programming is categorized as morning shows. The combination of a time slot, category and ratio can form a day-parting classification model. The data collected in the step 110 can be used to generate day-parts and categories in step 140, discussed in greater detail below.

In the step of collecting data from a second data source 120, the second data source can include public social data, which can include, for example, comments left by a user regarding a TV show on a public data source such as Twitter. The step 120 can include a step of crawling and analyzing video channels from the open web, which can include, for example, YouTube, Vimeo, Dailymotion and the like. The data collected from the step 120 can be analyzed according to various criteria including but not limited to one or more of the following: a number of views, a number of likes or dislikes, a number of subscribers, a number of total video views, a number of videos, a frequency of updates, a frequency of comments, a measurement of engagement points (such as, for example, a number of comments, a number of likes, a number of dislikes, a number of replies to comments and a frequency of replies to comments), comment analysis (such as, for example, a search for terms that express a sentiment, a search for certain adjectives, a search for certain topics), recommended channels associated with the channel in question, an average a number of views per video and the like.

The step 120 can include categorization for each channel. Categories can be defined from a particular source. Also, categories can be developed from comment analysis for given keywords that match a pre-established list of categories created for the method before executing the method.

The step 120 can include an assignment of web content and/or channels to day-parting slots based on a day-parted model.

The step of personalizing day-parting 130 can include personalization based on a user's usage behavior. For example, if a user watches channels from system-provided dayparting stacks, the system can provide those channels more frequently at that given time and can gradually increase or decrease these channels over time. Also, if the user watches channels from their own subscriptions, the system can match and add those channels into the system-provided dayparting stacks at the appropriate time.

The step 130 can include personalization based on a social feed, which can include private and/or public data. For example, the system can add shared video channels into system-provided dayparting channels.

The step 130 can include personalization based on collaborative filtering. For example, the usage behavior of similar users can be used to alter ratios at the appropriate time.

An example of personalization in the step 130 is provided below with reference to YouTube. If a user signs into the user's YouTube account, then the present method can retrieve subscriptions associated with the user's YouTube account, classify the subscriptions into categories, formulate a ratio of subscriptions by category and/or time slot, consolidate the user's subscription-based category ratio with a system ratio for each dayparting slot. That is, for example, the ratio determined from analyzing data from the user's YouTube and the ratio already present in the system (or a default value) can be progressively combined into a single ratio. According to one embodiment, a user's YouTube subscriptions are retrieved using Google's YouTube API.

The personalization step 130 can include three different methods of dayparting. (1) The step 130 can include the return of more system channels matched with a new ratio at different dayparting slots. (2) The step 130 can include adding the most-watched channel(s) from the user's subscriptions into the daypart stack and can show along with system channels according to appropriate dayparting slots. (3) The step 130 can return a virtual channel (that belongs to the user's subscription stack) according to dayparting. For example, if a given stack equals a given time slot (for example, 6 a.m. to 7 a.m.) and if the user signs into a site like YouTube, then the system can return a systemRatio, match the systemRatio with appropriate subscriptions, and return a virtualChannel (for example, episodes from the appropriate subscriptions when the virtual channel is selected). The system can also deliver dayparted episodes in the virtual channel.

The day-parting distribution method of the present disclosure can be based on ratio weight for selection of a category. For example, if the early morning time slot is defined as having 80% News, 10% Talk Shows and 10% Variety Shows, and if the early morning time slot has 10 slots, then an algorithm according to the present disclosure can select eight pieces of content from the News category, one piece of content from the Talk Show category, and one piece of content from the Variety Show category.

Figure 2:
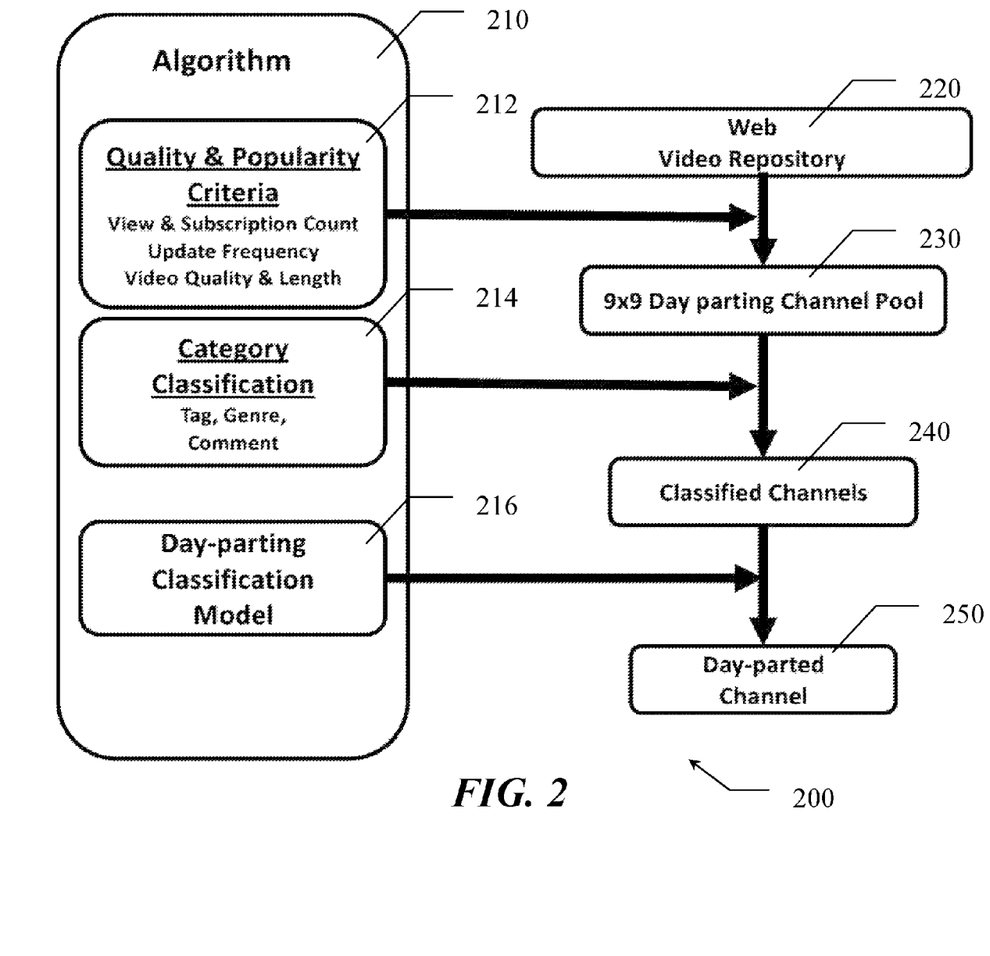
FIG. 2 depicts an example of another method and system according to the present disclosure.

FIG. 2 depicts an example of another method and system 200 according to the present disclosure. The method and system 200 can include an algorithm 210, a web video repository 220, a day parting channel pool 230, classified channels 240 and a day-parted channel 250. The algorithm 210 can include quality and popularity criteria 212, which can include a count of views, a count of subscriptions, an update of frequency, video quality, video length and the like. The algorithm 210 can include a category classification 214, which can include a tag, a genre, a comment and the like. The algorithm 210 can include a day-parting classification model 216. Data from the web video repository 220 can be organized using the quality and popularity criteria 212 of the algorithm 210 to produce the day parting channel pool 230. The day parting channel pool 230 can be organized using the category classification 214 to produce classified channels 240. The classified channels 240 can be organized using the day-parting classification model 216 to produce a day-parted channel 250.

Figure 3:
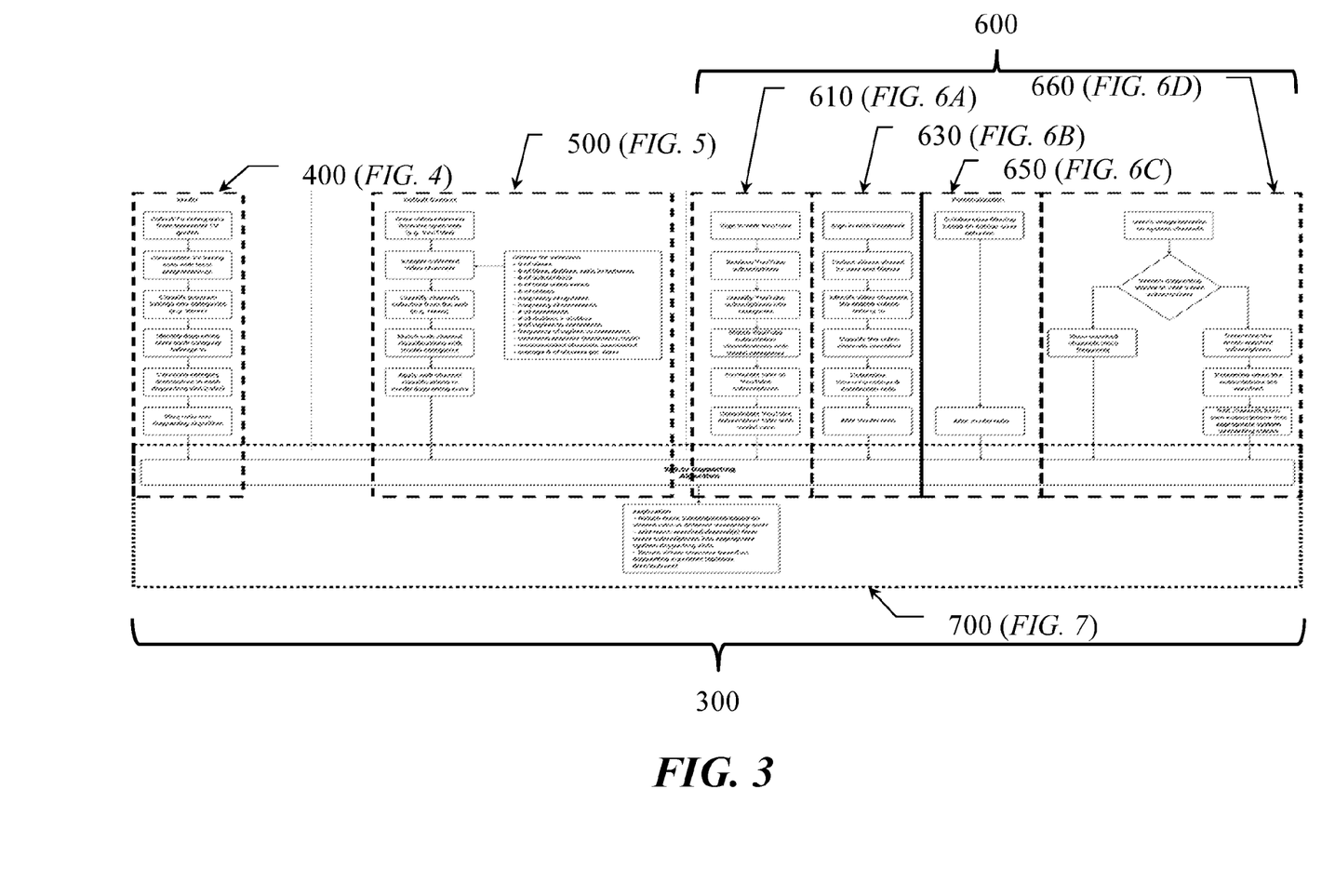
FIG. 3 depicts yet another example of a method and system according to the present disclosure and includes an overview of FIGS. 4-7.

FIG. 3 depicts yet another example of a method and system 300 according to the present disclosure. The method and system 300 can include a model data system 400 (e.g., FIG. 4), a default content system 500 (e.g., FIG. 5), a personalization system 600 (e.g., FIGS. 6A, 6B, 6C and 6D), and a dayparting distribution system 700 (e.g., FIG. 7).

Figure 4:
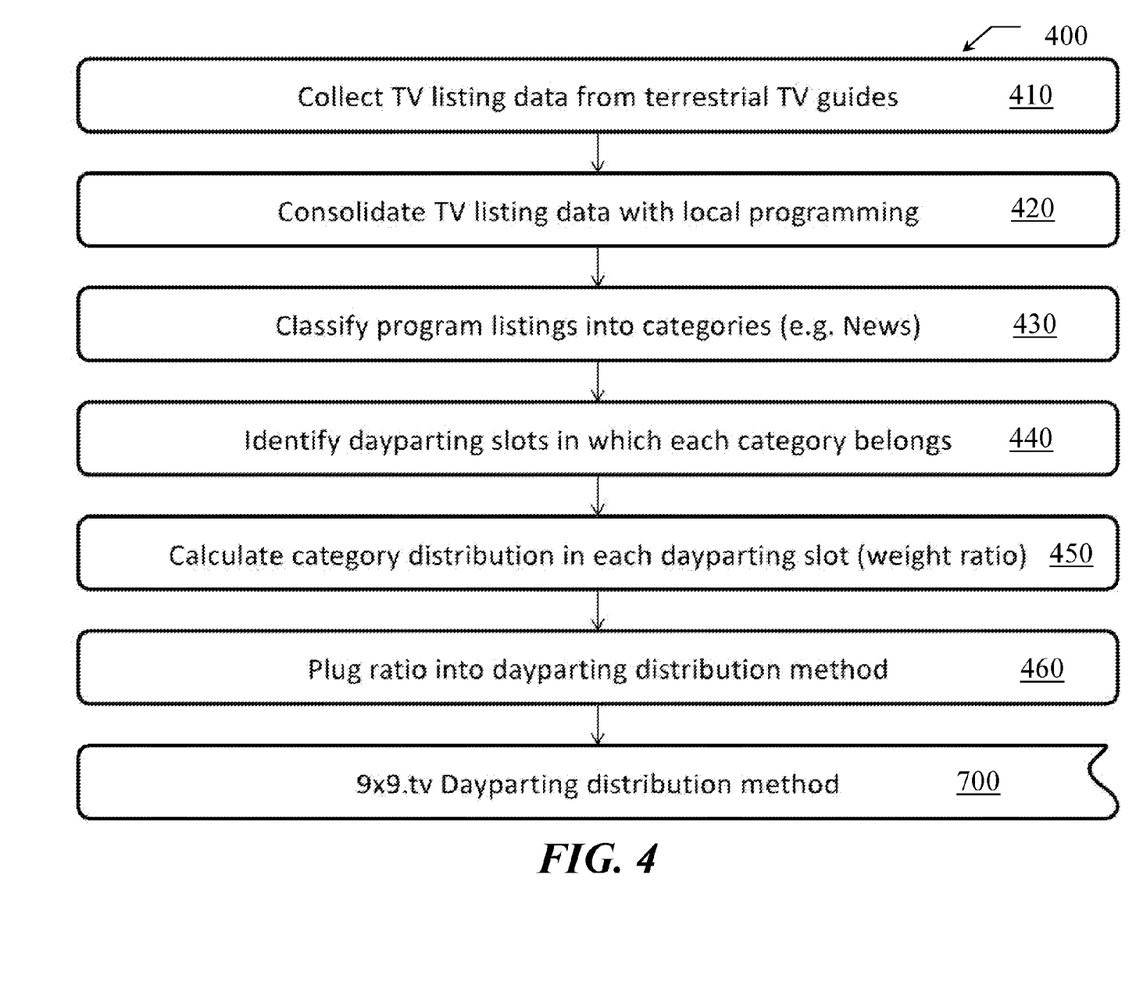
FIG. 4 depicts an example of a model data system according to the present disclosure.

FIG. 4 depicts an example of the model data system 400, which can execute one or more of the following steps: collect TV listing data from electronic programming guides 410, consolidate TV listing data with local programming 420, classify program listings into categories (e.g., News) 430, identify dayparting slots in which each category belongs 440, calculate category distribution in each dayparting slot (weight ratio) 450, plug ratio into dayparting distribution method 460, and send data to the dayparting distribution system 700.

Figure 5:
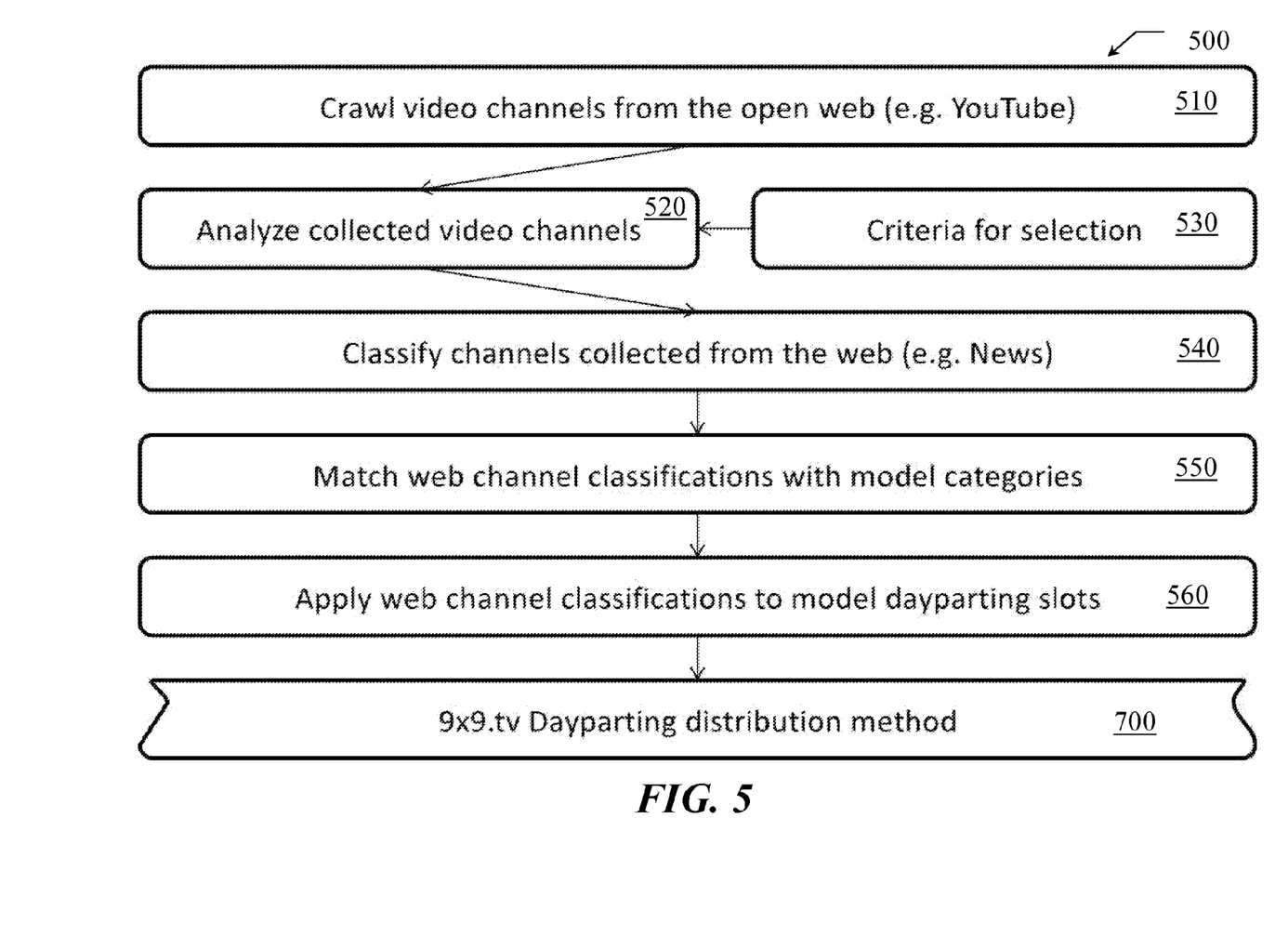
FIG. 5 depicts an example of a default content system according to the present disclosure.

FIG. 5 depicts an example of the default content system 500, which can execute one or more of the following steps: crawl video channels from the open web (e.g., YouTube) 510, analyze collected video channels 520, classify channels collected from the web (e.g., News) 540, match web channel classifications with model categories 550, apply web channel classifications to model dayparting slots 560, and send data to the dayparting distribution system 700.

Figure 6A:
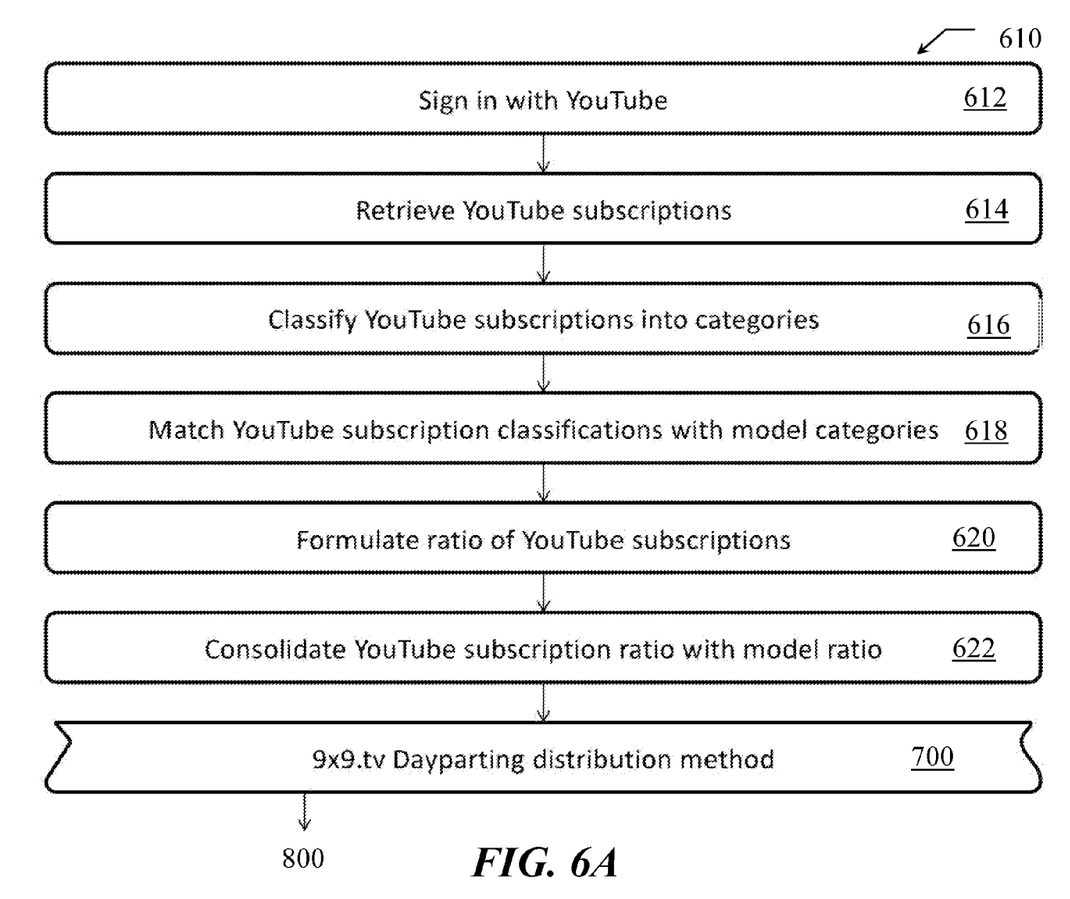
FIG. 6A depicts an example of a content provider personalization system according to the present disclosure.
Figure 6B:
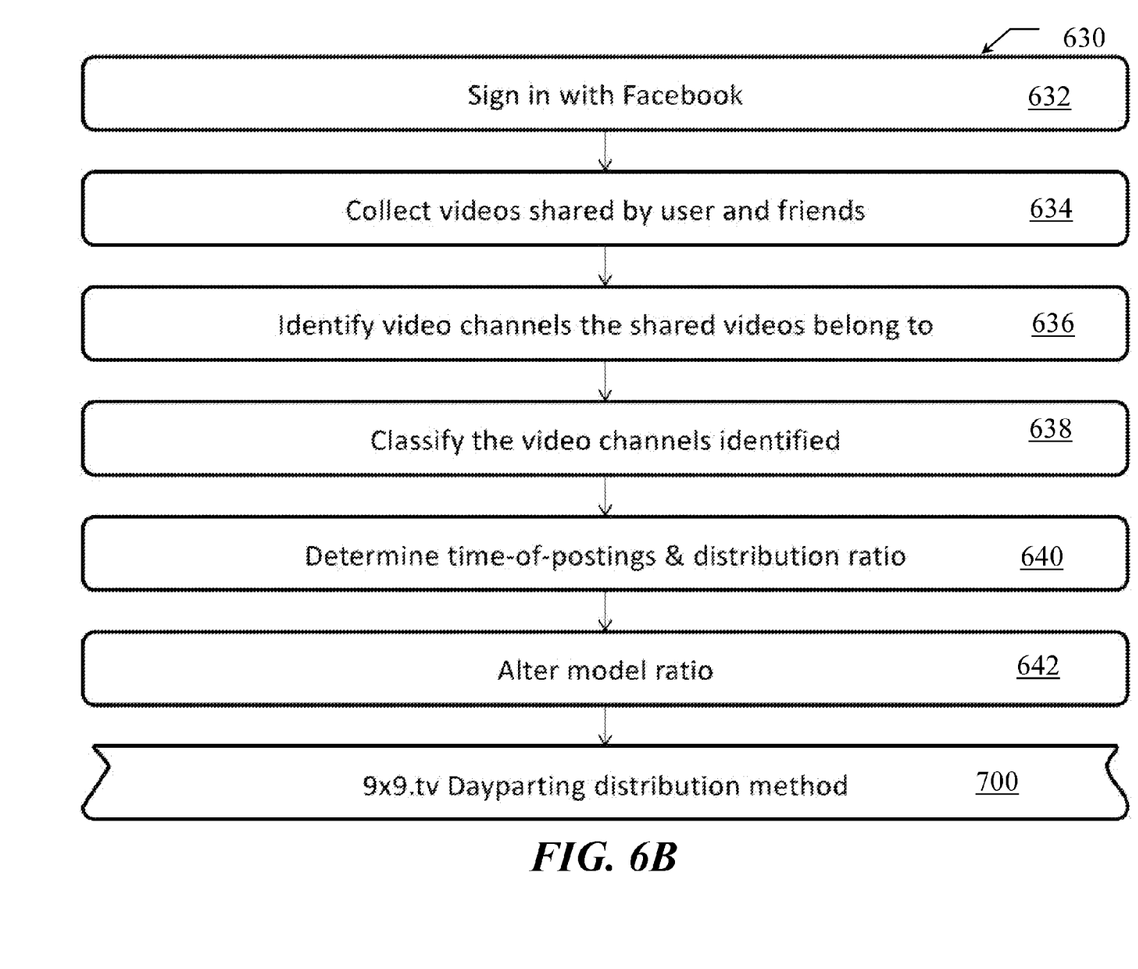
FIG. 6B depicts an example of a social media personalization system according to the present disclosure.
Figure 6C:
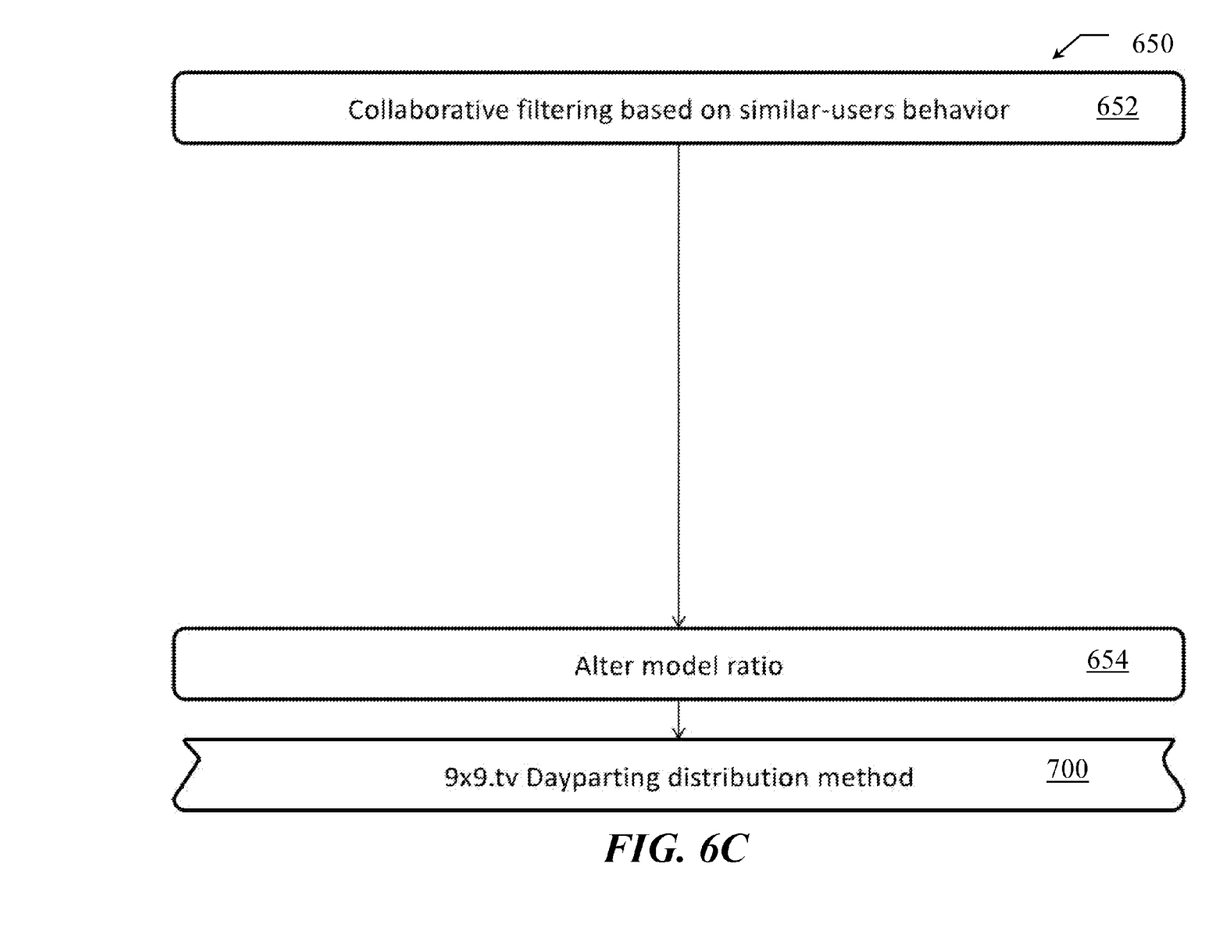
FIG. 6C depicts an example of a collaborative filtering personalization system according to the present disclosure.
Figure 6D:
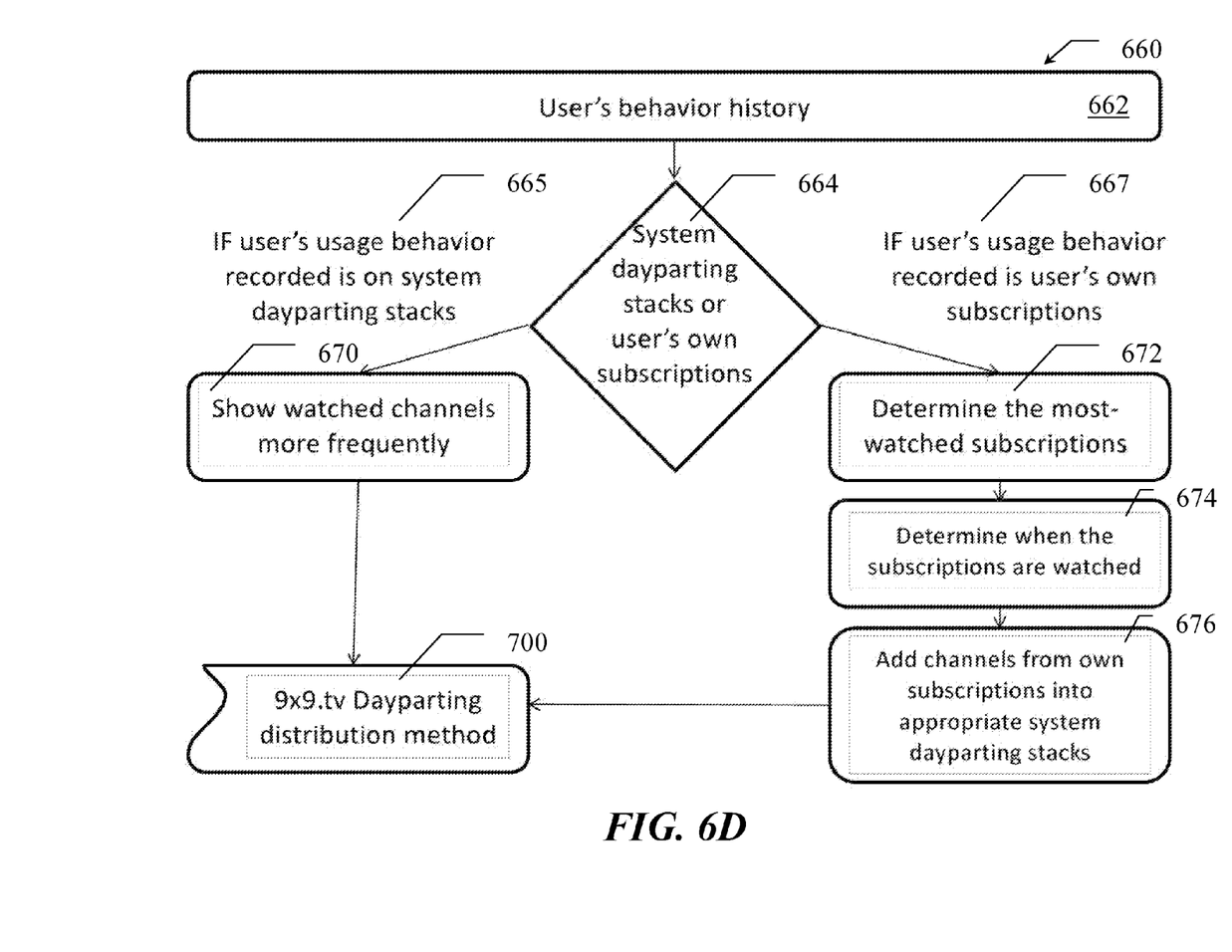
FIG. 6D depicts an example of a user usage behavior personalization system according to the present disclosure.

FIG. 6 depicts an example of the personalization system 600, which can include one or more of the following systems: a content provider personalization system 610 (FIG. 6A), a social media personalization system 630 (FIG. 6B), a collaborative filtering personalization system 650 (FIG. 6C), and a user usage behavior personalization system 660 (FIG. 6D).

FIG. 6A depicts an example of the content provider personalization system 610, which can execute one or more of the following steps: sign in with a content provider (such as YouTube) 612, retrieve content provider subscriptions 614, classify content provider subscriptions into categories 616, match content provider subscription classifications with model categories 618, formulate ratio of content provider subscriptions 620, consolidate content provider subscription ratio with model ratio 622 and send data to the dayparting distribution system 700.

FIG. 6B depicts an example of the social media personalization system 630, which can execute one or more of the following steps: sign in with a social media website (such as Facebook) 632, collect videos shared by user and friends 634, identify video channels the shared videos belong to 636, classify the video channels identified 638, determine time-of-postings and distribution ratio 640, alter model ratio 642, and send data to the dayparting distribution system 700. The present method, system and software can be adapted to determine the user's viewing preferences. Generally, for example with respect to a social media site like Facebook, there can be two types of sources, that is, an uploaded video or a linked video. The present method, system and software can be adapted to formulate a channel based on an individual user's account. Also, given that links to videos are typically more common, the present method, system and software can be adapted to identify a channel or genre based on a single linked post to an episode from a particular series of episodes. The present method, system and software can analyze the time of posting, meta data and the like. As such, a social media website such as Facebook can be used to personalize the dayparting algorithm and can itself be used as content source.

FIG. 6C depicts an example of the collaborative filtering personalization system 650, which can execute one or more of the following steps: filter collaboratively based on similar-users behavior 652, alter model ratio 654, and send data to the dayparting distribution system 700.

FIG. 6D depicts an example of the user usage behavior personalization system 660, which can execute one or more of the following steps: analyze user's behavior history 662; determine whether system dayparting stacks or user's own subscriptions are to be utilized 664; if the user's recorded behavior is on the system dayparting stacks 665, then show watched channels more frequently 670; if the user's usage recorded behavior is the user's own subscriptions 667, then determine the most-watched subscriptions 672, determine when the subscriptions are watched 674, and add channels from own subscriptions into the appropriate system dayparting stacks 676; and send data to the dayparting distribution system 700.

Figure 7:
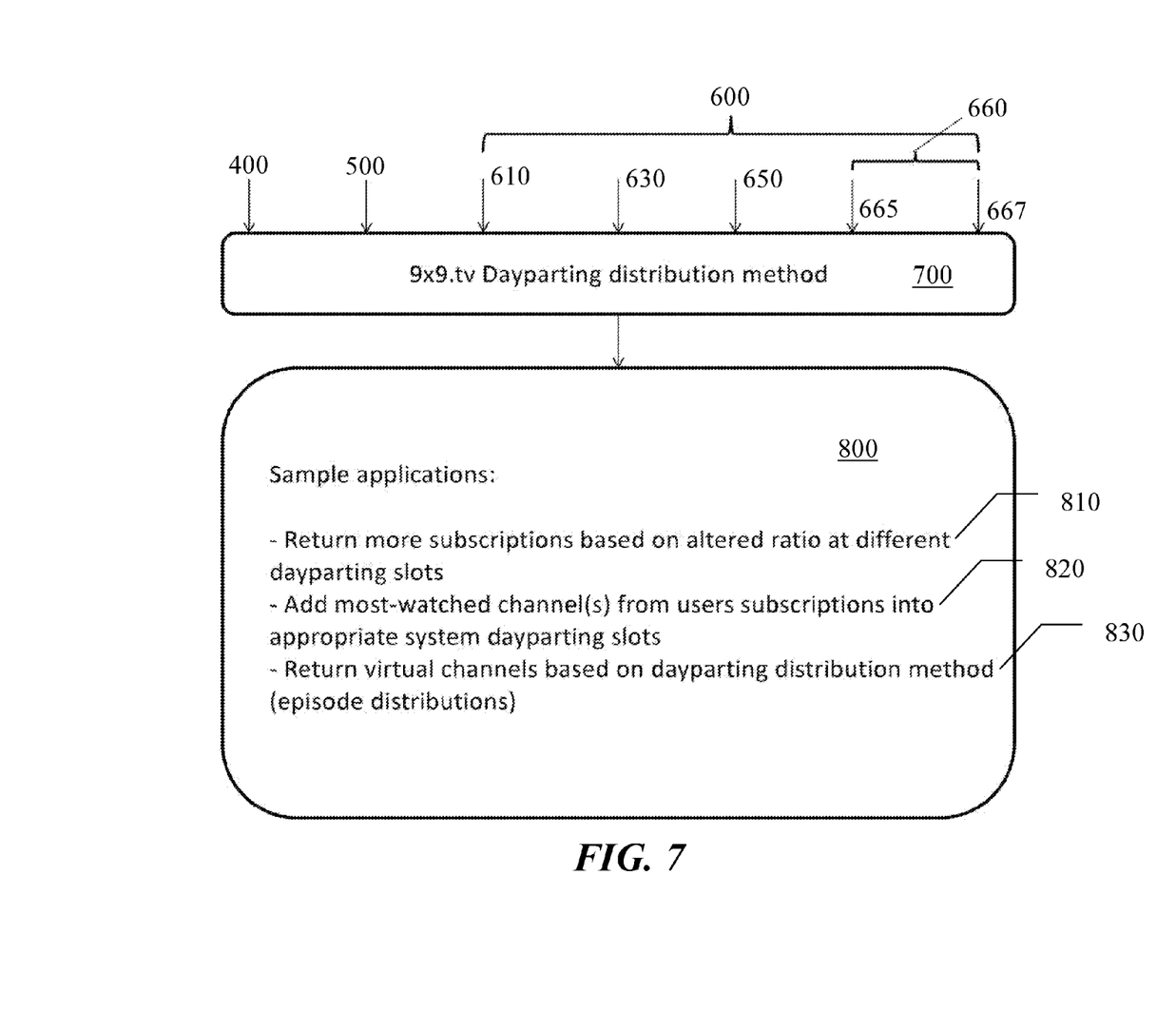
FIG. 7 depicts an example of a dayparting distribution system according to the present disclosure.

FIG. 7 depicts an example of the dayparting distribution system 700, which can execute one or more of the following steps: send data to a content delivery system 800, which can include one or more of the following steps: return more subscriptions based on altered ratio at different dayparting slots 810, add most-watched channel(s) from users subscriptions into appropriate system dayparting slots 820, and return virtual channels based on dayparting distribution method (episode distributions) 830.

In one embodiment, a ratio adjustment can be made according to the following variables, ratios and ratio adjustment formula:

Variables:
i. An=Category
ii. Tn=Time-slot

Collected ratios:
i. r=Model ratio
ii. r1=Content provider subscription ratio or Social media website ratio
iii. r2=CF ratio
iv. r3=Usage ratio
v. x=adjusted ratio Ratio adjustment formula: $x=\{[(r+r1)/2]+[(r+r2)/2]+[(r+r3)/2]\}/3$. The above formula is only an example. Many other variations are possible.

First, a distribution ratio of the model data can be obtained (distribution of categories in each time-slot/day-part), which is r. Then, the model ratio can be recalibrated according to a schedule, such as every 24 hours (or any other predefined schedule), by factoring r1, r2, and r3 for each category in the time-slot/day-part.

A sample scenario based on the ratio adjustment formula is provided as follows:

TABLE 1

EXAMPLES OF DAY-PARTS AND CATEGORIES

1. Morning Shows (6am-10am)
    a. News (e.g., CNN, ABC News)
    b. Morning Shows (e.g., The View, Ellen DeGeneres Show)
    c. Music (e.g., The Warner Sound)
2. Daytime Mix (10am-4pm)
    a. Morning Shows
    b. Music
    c. Sports (e.g., NBA, Redbull)
    d. Funny (e.g., Just For Gags, BFvsGF)
    e. Movie Reviews/Trailers (e.g., Clevver Movies, Reelz)
    f. Fashion & Style (e.g., Clevver Style, Michelle Phan Beauty)
3. Slack Time (4pm-7pm)
    a. Food (e.g., Food Network, Divas Can Cook, BBQ Pit Boys)
    b. Travel (e.g., Travel Channel, The Lonely Island)
    c. Fashion & Style
    d. Sports
    e. Light News & Entertainment (e.g., The Onion, Rolling Stone Magazine, New York Post, TMZ)
    f. Videogames (e.g., Machinima, IGN)
    g. How-to (e.g., Expert Village, HowdiniGuru)
4. Evening News (7pm-8pm)
    a. News
5. Primetime Originals (8pm-10pm)
    a. Movie Reviews/Trailers
    b. Original Movies (e.g., Crackle Movies, Crackle Comedy Movies)
    c. Talent Shows (e.g., X Factor US, America's Got Talent, Artists Live)
    d. Shorts (e.g., Wong Fu Productions, College Humor, FreddieW, Machinima Prime)
    e. Light News & Entertainment
    f. Premium TV Shows (e.g., TLC, Discovery Network, NatGeoWild, Journey Man Pictures)
    g. Cartoons (e.g., FOX Cartoons, Mondo Media)
    h. Funny (e.g., Improv Everywhere, Comedy Central)
6. Late Night Shows (10pm-12am)
    a. Sports
    b. Late Night Talk Shows (e.g., Conan O'Brien Show, Jimmy Kimmel Live)
    c. Mature Humor (e.g., Adult Swim, Kassem G)
    d. Funny
    e. Fail (e.g., Cute Win Fail)
7. Night Owl (12am-6am)
    a. Mature Audience (e.g., Playboy TV, FHM, Esquire, Simple Pickup)

First, the day-parting distribution method obtains the model ratio (Tn=timeslot n, r=ratio, A=category).

TABLE 2

MODEL RATIO

| T | r(A1) | r(A2) | r(A3) | r(A4) |
|---|---|---|---|---|
| T1 | 0.6 | 0.2 | 0.1 | 0.1 |
| T2 | 0.2 | 0.3 | 0.4 | 0.1 |

Next, adjusted ratios (x) are calculated for T1 and T2.

TABLE 3

SAMPLE ADJUSTED RATIO FOR T1

| A | r1 | r2 | r3 | x |
|---|---|---|---|---|
| A1 | 0.3 | 0.2 | 0.4 | 0.45 |
| A2 | 0.3 | 0.4 | 0.4 | 0.28 |
| A3 | 0.2 | 0.3 | 0.1 | 0.15 |
| A4 | 0.2 | 0.1 | 0.4 | 0.12 |

TABLE 4

SAMPLE ADJUSTED RATIO FOR T2

| A | r1 | r2 | r3 | x |
|---|---|---|---|---|
| A1 | 0.3 | 0.2 | 0.4 | 0.25 |
| A2 | 0.3 | 0.4 | 0.4 | 0.33 |
| A3 | 0.2 | 0.3 | 0.1 | 0.3 |
| A4 | 0.2 | 0.1 | 0.4 | 0.12 |

Sample output based on the sample scenario and the ratio adjustment formula are provided as follows:
The model ratio is recalibrated with adjustments.

TABLE 5

MODEL RATIO

| T | r(A1) | r(A2) | r(A3) | r(A4) |
|---|---|---|---|---|
| T1 | 0.6 | 0.2 | 0.1 | 0.1 |
| T2 | 0.2 | 0.3 | 0.4 | 0.1 |

TABLE 6

MODEL RATIO AFTER ADJUSTMENTS

| T | r(A1) | r(A2) | r(A3) | r(A4) |
|---|---|---|---|---|
| T1 | 0.45 | 0.28 | 0.15 | 0.12 |
| T2 | 0.25 | 0.33 | 0.3 | 0.12 |

To put the data in context, Tables 5 and 6 are presented below as Tables 7 and 8 with sample time slots and category names in accordance with the present disclosure.

TABLE 7

MODEL RATIO

| T | News | Sports | SO | Music |
|---|---|---|---|---|
| Morning | 0.6 | 0.2 | 0.1 | 0.1 |
| Evening | 0.2 | 0.3 | 0.4 | 0.1 |

TABLE 8

MODEL RATIO AFTER ADJUSTMENTS

| T | News | Sports | SO | Music |
|---|---|---|---|---|
| Morning | 0.45 | 0.28 | 0.15 | 0.12 |
| Evening | 0.25 | 0.33 | 0.3 | 0.12 |

In accordance with Tables 7 and 8, for example, according to the present disclosure, a model ratio can initially set the default parameters for dayparting content. According to the model, a user would, according to the default parameters, be presented with 60% news, 20% sports, 10% special order (SO) and 10% music in the morning, and the user would be presented with 20% news, 30% sports, 40% SO and 10% music in the evening. However, after adjusting the model based, for example, on the user's viewing preferences on a video content delivery site such as YouTube, the present method, system and software can determine that the user has a preference for relatively less news in the morning and a little more news in the evening as compared to the model. After the adjustments to the ratio according to the present disclosure, for example, the user could instead be presented with 45% news, 28% sports, 15% SO and 12% music in the morning, and the user could instead be presented with 25% news, 33% sports, 30% SO and 12% music in the evening. These examples are for illustration purposes only. Any number of categories and time slots can be employed.

The present system, method, and software day parting algorithm can apply equally to audio programming (such as radio programming) in addition to video programming. Radio programming also has programming guide similar to the TV guide. Audio content can also be commented on social networks. All of the analysis/algorithms disclosed can be equally applied to audio programming.

The present system, method and software can be adapted to display content on any suitable display device including but not limited to a locally or remotely operated television, mobile device with a display, computer monitor and the like.

Although some of various drawings illustrate a number of logical stages in a particular order, stages which are not order dependent can be reordered and other stages can be combined or broken out. Alternative orderings and groupings, whether described above or not, can be appropriate or obvious to those of ordinary skill in the art of computer science. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to be limiting to the precise forms disclosed. Many modifications and variations are possible in view of the above teachings. The embodiments were chosen and described in order to best explain the principles of the aspects and its practical applications, to thereby enable others skilled in the art to best utilize the aspects and various embodiments with various modifications as are suited to the particular use contemplated.

We claim:
1. A computer implemented method for organizing and delivering audio-visual content, comprising:
   on a computing device having one or more processors and a memory storing one or more programs for execution by the one or more processors, the one or more programs including instructions for:

developing a dayparting ratio of the audio-visual online content based on a first source of information, a second source of information, and a third source of information, the first source of information is information extracted from an electronic programming guide, the second source of information is information extracted from a publicly available internet-based content provider and the third source of information is information extracted from a password-protected internet-based content provider;

modifying the dayparting ratio of the audio-visual content based on the information extracted from the publicly available internet-based content provider, which includes: collecting video channels from the publicly available internet-based content provider, analyzing the collected video channels, classifying channels from the collected video channels, matching the web channel classifications with model categories, applying the web channel classifications to model dayparting slots to form a modified dayparting ratio, and inputting the modified dayparting ratio into the dayparting distribution system; and delivering the audio-visual content based on the modified dayparting ratio.

2. The method of claim 1, wherein the step of developing the dayparting ratio of the audio-visual content based on the information extracted from the electronic programming guide comprises instructions for:

collecting television listing data from electronic programming guides;

consolidating television listing data with local programming; classifying program listings into model categories;

identifying model dayparting slots in which each model category belongs;

calculating a model category distribution in each model dayparting slot to form the model dayparting ratio; and inputting the model dayparting ratio into a dayparting distribution system.

3. The method of claim 1, wherein the step of modifying the dayparting ratio of the audio-visual content based on the information extracted from the password-protected internet-based content provider further comprises instructions for:

prompting a user to sign into the password-protected internet-based content provider; retrieving subscriptions from the password-protected internet-based content provider; classifying the password-protected internet-based content provider subscriptions into categories;

matching the password-protected internet-based content provider subscription classifications with model categories;

formulating a ratio of password-protected internet-based content provider subscriptions; consolidating the password-protected internet-based content provider subscription ratio with a model dayparting ratio; and inputting the consolidated dayparting ratio into the dayparting distribution system.

4. The method of claim 1, wherein the password-protected internet-based content provider is a social media website, and wherein the step of modifying the dayparting ratio of the audio-visual content based on the information extracted from the social media website further comprises instructions for:

prompting a user to sign into the social media website;

collecting videos shared by the user and friends of the user;

identifying video channels based on the shared videos;

classifying the video channels into categories;

determine time-of-postings and a distribution ratio;

altering a model dayparting ratio based on the distribution ratio, and inputting the altered dayparting ratio into the dayparting distribution system.

5. The method of claim 1, wherein the step of modifying the dayparting ratio of the audio-visual content based on the information extracted from the password-protected internet-based content provider further comprises instructions for:

selecting characteristics of a user from the information extracted from the password-protected internet-based content provider;

identifying similar users based on the selected characteristics of the user;

altering a model dayparting ratio based on the characteristics of the similar users; and inputting the altered dayparting ratio into the dayparting distribution system.

6. The method of claim 1, wherein the step of modifying the dayparting ratio of the audio-visual content based on the information extracted from the password-protected internet-based content provider further comprises instructions for:

analyzing a user's behavior history based on the information extracted from the password-protected internet-based content provider; and determining whether system dayparting stacks or a user's own subscriptions are to be utilized.

7. The method of claim 6, wherein, if the user's recorded behavior is on the system dayparting stacks, the step of modifying the dayparting ratio of the audio-visual content based on the information extracted from the password-protected internet-based content provider comprises instructions for:

determining the most-watched channels on the password-protected internet-based content provider;

altering a model dayparting ratio based on the most-watched channels; and inputting the altered dayparting ratio into the dayparting distribution system.

8. The method of claim 6, wherein, if the user's usage recorded behavior is the user's own subscriptions, the step of modifying the dayparting ratio of the audio-visual content based on the information extracted from the password-protected internet-based content provider comprises instructions for:

determining the most-watched subscriptions on the password-protected internet-based content provider;

determining a time when the most-watched subscriptions are watched;

altering a model dayparting ratio based on the most-watched subscriptions; and inputting the altered dayparting ratio into the dayparting distribution system.

9. The method of claim 1, wherein the step of delivering the audio-visual content based on the modified dayparting ratio comprises at least one instruction from the group consisting of:

returning more subscriptions based on the modified dayparting ratio at different dayparting time slots;

adding at least one most-watched channel from a user's subscriptions into an appropriate dayparting time slot; and returning virtual channels based on the modified dayparting ratio.

10. The method of claim 1, wherein the modified dayparting ratio comprises dayparts and categories.

11. The method of claim 10, wherein the dayparts comprise at least one daypart from the group consisting of: morning shows in a first time slot; daytime mix in a second time slot;

slack time in a third time slot; evening news in a fourth time slot; primetime originals in a fifth time slot; late night shows in a sixth time slot; and night owl in a seventh time slot.

12. The method of claim 10, wherein the categories comprise at least one category from the group consisting of: news, morning shows, music, sports, funny, movie reviews/trailers, fashion & style, food, travel, light news & entertainment, videogames, how-to, original movies, talent shows, shorts, premium television shows, cartoons, late night talk shows, mature humor, fail and mature audience.

13. The method of claim 1, wherein the audio-visual content is audio only content.

14. A computer system for organizing and delivering audio-visual content, the computer system comprising one or more processors; and memory to store one or more programs, the one or more programs comprising instructions for:

developing a dayparting ratio of the audio-visual online content based on a first source of information, a second source of information, and a third source of information, the first source of information is information extracted from an electronic programming guide, the second source of information is information extracted from a publicly available internet-based content provider and the third source of information is information extracted from a password-protected internet-based content provider;

modifying the dayparting ratio of the audio-visual content based on the information extracted from the publicly available internet-based content provider, which includes:

collecting video channels from the publicly available internet-based content provider,     analyzing the collected video channels,     classifying channels from the collected video channels,     matching the web channel classifications with model categories,     applying the web channel classifications to model dayparting slots to form a modified dayparting ratio, and     inputting the modified dayparting ratio into the dayparting distribution system; and     delivering the audio-visual content based on the modified dayparting ratio.

15. A nontransitory computer readable storage medium storing one or more programs configured to be executed by one or more processing units at a computer, the one or more programs comprising instructions for:

developing a dayparting ratio of the audio-visual online content based on a first source of information, a second source of information, and a third source of information, the first source of information is information extracted from an electronic programming guide, the second source of information is information extracted from a publicly available internet-based content provider and the third source of information is information extracted from a password-protected internet-based content provider;

modifying the dayparting ratio of the audio-visual content based on the information extracted from the publicly available internet-based content provider, which includes:

collecting video channels from the publicly available internet-based content provider,     analyzing the collected video channels,     classifying channels from the collected video channels,     matching the web channel classifications with model categories,     applying the web channel classifications to model dayparting slots to form a modified dayparting ratio, and     inputting the modified dayparting ratio into the dayparting distribution system; and     delivering the audio-visual content based on the modified dayparting ratio.

16. The method of claim 1, further comprising:

prior to the delivering, modifying the dayparting ratio of the audio-visual content based on the second source of information; and     modifying the dayparting ratio of the audio-visual content based on the third source of information.

17. The system of claim 14, the one or more programs further comprising instructions for:

prior to the delivering, modifying the dayparting ratio of the audio-visual content based on the second source of information; and     modifying the dayparting ratio of the audio-visual content based on the third source of information.

18. The nontransitory computer readable storage medium of claim 15, further comprising instructions for:

prior to the delivering, modifying the dayparting ratio of the audio-visual content based on the second source of information; and     modifying the dayparting ratio of the audio-visual content based on the third source of information.

* * * * *